United States Patent [19]

Dien et al.

[11] Patent Number: 4,834,769

[45] Date of Patent: May 30, 1989

[54] COMPOSITIONS FOR THE DYEING OF LEATHER

[75] Inventors: Michel Dien, Rixheim, France; Herbert Holliger, Allschwil, Switzerland

[73] Assignee: Sandoz Ltd., Basel, Switzerland

[21] Appl. No.: 130,243

[22] Filed: Dec. 8, 1987

[30] Foreign Application Priority Data

Dec. 10, 1986 [DE]  Fed. Rep. of Germany ....... 3642099
Aug. 13, 1987 [DE]  Fed. Rep. of Germany ....... 3726980

[51] Int. Cl.$^4$ .................... D06P 3/32; C07D 498/00; C07D 219/12
[52] U.S. Cl. ............................. 8/436; 8/658; 8/676; 8/679; 544/76; 546/103; 546/105; 546/106
[58] Field of Search ............... 8/436, 404, 643, 657, 8/658, 675, 676, 677, 679; 544/76; 546/103, 105, 106

[56] References Cited

U.S. PATENT DOCUMENTS

| | | | |
|---|---|---|---|
| 3,495,928 | 2/1970 | Weber | 8/657 |
| 4,073,615 | 2/1978 | Lacroix et al. | 106/22 |
| 4,082,505 | 4/1978 | Nonn et al. | 8/85 R |
| 4,309,180 | 1/1982 | Lacroix et al. | 8/436 |
| 4,390,342 | 6/1983 | Bruttel et al. | 8/524 |
| 4,453,943 | 6/1984 | Balliello | 8/524 |
| 4,537,598 | 8/1985 | Schaetzer et al. | 8/924 |
| 4,567,171 | 1/1986 | Mangum | 8/676 |
| 4,568,350 | 2/1986 | Rohrer | 8/657 |
| 4,705,524 | 11/1987 | Hahnke et al. | 8/924 |

FOREIGN PATENT DOCUMENTS

63300  9/1985  European Pat. Off. .

OTHER PUBLICATIONS

"Das Farben des Leders", G. Otto (1962), p. 177.
Abstracts of Japanese Kokai 75-138018.

*Primary Examiner*—Prince E. Willis
*Assistant Examiner*—Helene Kirschner
*Attorney, Agent, or Firm*—Gerald D. Sharkin; Richard E. Vila; Thomas C. Doyle

[57] ABSTRACT

Dye compositions containing (a) at least one blue sulpho group-containing triphendioxazine dye and (b) at least one blue sulpho group-containing anthraquinone dye and preferably (c) lignine sulphonic acid or a salt of it and optionally (d) a non-ionic blending agent are outstandingly suitable for the level and fast dyeing of leather substrates.

43 Claims, No Drawings

COMPOSITIONS FOR THE DYEING OF LEATHER

In the dyeing of leather in dark shades, e.g. in blue shades, one is particularly confronted with the problems of levelness of dyeing and of dyestuff penetration into the leather; the dye may tend to remain on the surface of the leather so that a bronzing effect on the grain and irregularly dyed portions may occur, or a larger portion of the dye may penetrate into the interior of the leather so that the dyeing appears empty and dull. In order to eliminate at least in part these undesired effects there may be employed e.g. dyeing assistants, but these alone are often not sufficient to eliminate such effects completely or sufficiently. It has now been found that a selected combination of blue dyes is particularly suitable for a level and brilliant dyeing of leather with optimum penetration in which by addition of particular assistants the positive effect may further be improved.

The invention relates to compositions that contain these dyes and preferably also further particular additives, and to the process of dyeing leather therewith.

The invention thus provides dye compositions comprising (a) at least one sulpho group-containing blue triphendioxazine dye and (b) at least one sulpho group-containing blue anthraquinone dye.

Component (a) is preferably a dye of formula (I):

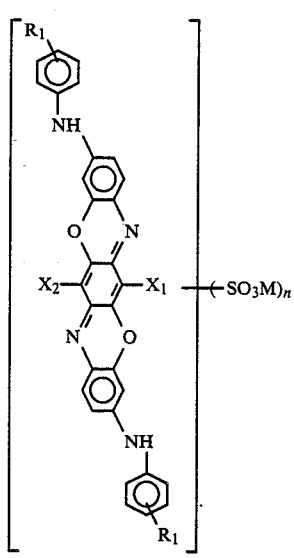

wherein $R_1$ signifies hydrogen, chlorine or methyl, $X_1$ and $X_2$ signify, independently from each other, hydrogen, halogen, cyano, $C_{1-4}$-alkyl or $C_{1-4}$-alkoxy, M signifies hydrogen or a cation and n is 2 to 3.

Of the alkyl and alkoxy radicals ethyl, methyl, ethoxy and methoxy are preferred; halogen is preferably chlorine or bromine, more preferably chlorine. Preferably both symbols $X_1$ and $X_2$ signify halogen, more preferably chlorine. $R_1$ is preferably hydrogen. The index n is preferably 2. The sulpho groups are preferably linked to the condensed benzo-rings, preferably one per benzo-ring, in particular in para-position to the corresponding oxygen atom.

The blue anthraquinone dyes of component (b) are advantageously dyes of the 1,4-diaminoanthraquinone-2-sulphonic acid series in which the amino group in the 1-position is unsubstituted and the amino group in the 4-position bears an aromatic or aliphatic radical, or dyes of the 1,4-diaminoanthraquinone series in which both amino groups are substituted and at least one of these two substituents is a sulpho group containing aromatic radical. These dyes preferably contain 1 to 2 sulpho groups per anthraquinone group. Preferably the blue anthraquinone dyes (b) correspond to the formula

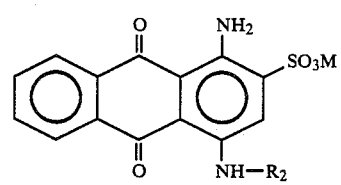

wherein $R_2$ is a radical of formula

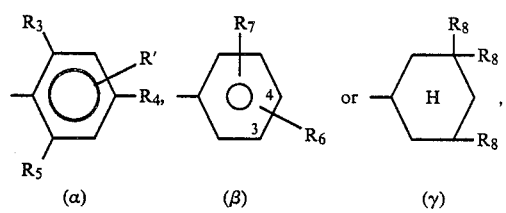

$R_3$, $R_4$ and $R_5$ independently signify hydrogen or methyl,

R' signifies hydrogen or —CH$_2$—NH—CO—R",

R" signifies mono- or $\alpha,\beta$-dihalo-vinyl or -ethyl, $R_6$ signifies cyano or a radical of the formula

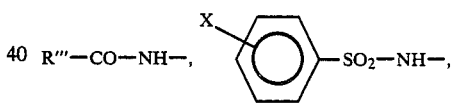

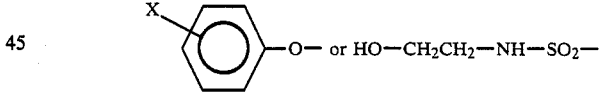

$R_7$ signifies hydrogen, chlorine or $C_{1-2}$-alkyl, or $R_7$ signifies hydrogen and $R_6$ signifies a radical of the formula

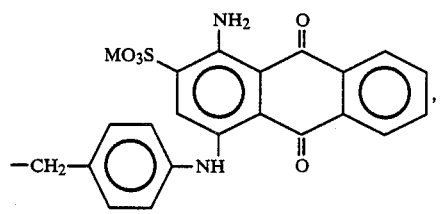

in the 4-position of the ring of formula ($\beta$), $R_8$ signifies hydrogen or methyl, X signifies hydrogen, methyl or chlorine, R''' signifies $C_{1-2}$-alkyl or phenyl and M signifies hydrogen or a cation or of the formula

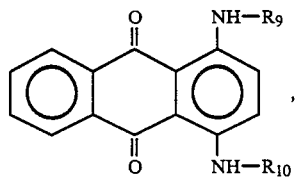

(III)

in which R₉ signifies a radical of the formula

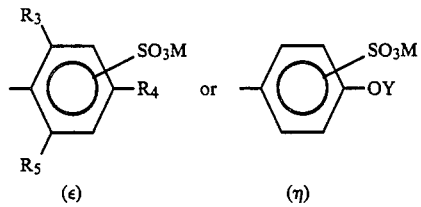

R₁₀ signifies a radical of the formula (γ) or (ε) and Y signifies hydrogen or $C_{1-2}$-alkyl.

The substituent R₇ is preferably either in para-position to R₆ or in para-position to the amino group linked to the anthraquinone nucleus.

The symbol M in the dyes of the formulae (I), (II) and (III) represents hydrogen or preferably a cation conventional for salt formation in anionic dyes, advantageously alkali metal (lithium, sodium or potassium), unsubstituted ammonium or an ammonium cation deriving from a low molecular aliphatic amine, preferably mono-, di- or triethanol- or -isopropanolammonium. More preferably M signifies sodium or unsubstituted ammonium. Of the dyes of formula (II) the ones in which R₂ signifies a radical of formula (α) are preferred.

Of the dyes of formula (III) the ones are preferred in which at least one of R₉ and R₁₀ stands for a radical of formula (ε); more preferably both of R₉ and R₁₀ signify each a radical of formula (ε). Of the dyes (b) the ones of formula (III) are preferred.

The weight ratio of component (a) to (b) is preferably greater than 1; advantageously the compositions of the invention contain 18–60, preferably 30–45 parts by weight of component (b) to 100 parts by weight of component (a).

Particularly preferred are compositions that contain (c) lignosulphonic acid or a salt thereof in addition to components (a) and (b).

Component (c) is preferably in salt form, for example alkali metal salts, earth alkali metal salts or ammonium salts. Preferred salts are lithium, sodium, potassium or ammonium salts, in particular the sodium or ammonium salts of lignosulphonic acid. Any conventional grades of lignosulphonate are suitable, but purer grades having less colour are preferred, since they interfere less with the blue shade of components (a) and (b).

The weight ratio of component (c) to the sum of components (a) and (b) is advantageously 0.2:1 to 2:1, preferably 0.35:1 to 1.5:1, more preferably 0.6:1 to 1:1.

Along with components (a), (b) and optionally (c) the compositions of the invention may contain additional electrolytes, for example inorganic salts from the synthesis of the dyes. The content of additional electrolytes is suitably no more than 100% of the sum of (a)+(b); but lower salt contents, for example 5–40% of (a)+(b) are preferred. If desired the dyes may also be in completely or nearly completely salt free form, which may be achieved i.e. by dialysis of the dye solutions in conventional manner.

According to a particular aspect of the invention the compositions of the invention further comprise along with components (a), (b) and optionally (c), (d) a non-ionic blending agent.

Blending agents (d) are advantageously hydrophilic, and are preferably derivatives of polysaccharides, in particular dextrines, e.g. the so-called white or yellow dextrines (yellowish coloured to practically colourless) or cyclodextrines and dried glucose syrups, preferably malto-oligosaccharides-containing products obtained by enzymatic or acid hydrolysis of starch. Of the dried glucose syrups those with a high content of oligosaccharides and polysaccharides, in particular ≧ 85% are preferred.

The weight ratio of component (d) to the sum of components (a) and (b) is advantageously up to 5:1, preferably up to 3:1, more preferably 1.2:1 to 5:1, in particular 1.2 to 3:1.

Most preferred are compositions that contain (a), (b), (c) and (d).

The compositions of the invention may be in the form of aqueous compositions or, preferably, in the form of dry mixtures. They may be prepared in a manner known per se, e.g. by plain admixture of the components or by dry or wet granulation. According to the most preferred and simplest mode of production, components (a) and(b) and, if present, also (c) and optionally (d) are mechanically mixed with each other (e.g. in a mixer) in the indicated weight ratio. Optionally conventional antidusting agents, e.g. mineral oils may be added thereto.

The compositions of the invention comprising (a) and (b) are useful for the dyeing of leather from aqueous media and for this they are employed advantageously together with component (c) and in particular also with component (d). With particular reference the components (a), (b) and (c) and, if present, (d) are employed in the form of the compositions of the invention as described above.

Any kind of tanned leather commonly used as a substrate for dyeing from aqueous media may be used for the process of the invention, particularly grain leather (e.g. nappa from sheep, goat or cow and box leather from calf or cow), suede leather (e.g. velours from sheep, goat or calf and hunting leather), split velours (e.g. from cow or calf skin), buckskin and nubuk leather; further also wool-bearing skins and furs (e.g. fur-bearing suede leather). The leather may have been tanned by any usual tanning method, in particular vegetable, mineral, synthetic or combined tanned (e.g. chrome tanned, zirconyl tanned, aluminium tanned or semichrome tanned). If desired, the leather may also be retanned; for retanning, there may be used any tanning agent conventionally employed for retanning, e.g. mineral, vegetable or synthetic tanning agents [e.g. chromium, zirconyl or aluminium derivatives, oak, quebracho, chestnut or mimosa extract, aromatic syntans, polyurethanes, copolymers of (meth)-acrylic acid compounds or melamine/, dicyanodiamide/ and/or urea/-formaldehyde resins].

The leathers may be of various thicknesses, thus there may be used very thin leathers such as bookbinders' leather or glove leather (nappa), leather of medium thickness such as shoe upper leather, garment leather and leather for handbags or also thick leathers such as shoe sole leather, furniture leather, leather for suitcases, for belts and for sport articles; hair-bearing leathers and furs may also be used. After tanning (in particular after a retanning) and before the dyeing process of the invention the pH of the leather is advantageously set to values in the range of 4 to 8 (the leather is "neutralized"); depending on the kind of the leather there may be chosen an optimum pH-range, mainly as follows: for grain leather and thick leathers (such as nubuk) pH values in the range of 4 to 6; for suede leathers, split velours and for very thin leathers pH-values in the range of 4.5 to 8.0; for intermediately dried suede leathers and intermediately dried split velours, the pH-values may range in the scope of 5 to 8.0. For the adjustment of the pH-value of the leather, there may be employed conventional assistants; for tanned leather of acidic character the pH may be adjusted by addition of suitable bases, e.g. ammonia or ammonium bicarbonate or alkali metal salts of weak acids, e.g. sodium formate, sodium acetate, sodium bicarbonate, sodium carbonate or sodium bisulphite of which sodium formate and ammonium bicarbonate are preferred. Sodium bicarbonate is usable in particular as a second base for the exact adjustment of the superficial pH-value of the leather. Mineral tanned leather may, if desired, also be masked, e.g. with alkali metal formate, oxalate or polyphosphate or e.g. with titanium/potassium oxalate.

The dyeing may be carried out in a manner known per se, suitably in an aqueous medium and under conventional temperature and pH conditions, e.g. in the temperature range of 20–70° C., preferably 25–60° C., milder temperature conditions, in particular in the range of 25–40° C., being preferred for the achievement of deeper penetrations and for the dyeing of wool-bearing skins and furs. The pH-values of the dye-bath may, in general, range broadly, mainly from pH 9 to pH 3; in general the dyeing may be advantageously begun at higher pH-values and concluded at lower pH-values. Preferably the dyeing is carried out at pH-values $\geq 4$, in particular in the range of 9 to 4 and for the conclusion of the dyeing procedure the pH-value is lowered, (e.g. by addition of an acid conventional in the leather-dyeing technique, such as acetic acid or formic acid) preferably to values in the range between 4 and 3. The total dye concentration may range broadly, if desired up to the saturation degree of the substrate, e.g. up to 5%, referred to the wet weight of the substrate. Thus very fine deep blue dyeings may already be obtained at a concentration of 3% of the dye mixture (a)+(b). If desired the dyeing may be carried out in the presence of a dyeing assistant; these are mainly conventional non-ionic or anionic products (in particular hydrophilic surfactants, preferably hydrophilic polysaccharide derivatives or poly-oxyethylated alkylphenols or sulpho group-containing aromatic compounds). Preferably the dyeing is carried out in the presence of component (c), the latter being preferably already present in the dyeing composition. With particular advantage, also component (d) is present in the dyeing, the latter being preferably also already present in the dyestuff composition of the invention.

A fatting step may, if desired, be carried out before and/or after the dyeing process, preferably in the same liquor. Fatting after the dyeing process is advantageously carried out before any acid addition by which the dyeing is fixed by means of lowering the pH-value of the bath.

For the fatting (in particular fat-liquoring) step there may be used any conventional natural animal, vegetable or mineral fat, fat oil wax, resin or resin oil or chemically modified animal or vegetable fat or oil which include in particular: tallow, fish oils, neats foot oil, olive oil, castor oil, rapeseed oil, linseed oil, wood oil, cottonseed oil, sesame oil, corn oil and japanese tallow and chemically modified products thereof (e.g. hydrolysis, transesterification, oxidation, hydrogenation and sulphonation products), beeswax, Chinese wax, carnauba wax, montan wax, wool fat, colophony, birch oil, shellack, mineral oils with boiling range within 300 and 370° C. (particularly the so-called "heavy alkylates"), soft paraffin, medium paraffin, hard paraffin, Vasetine ® petroleum jelly, ceresine and methyl esters of $C_{14-22}$ fatty acids; and synthetic leather fatting agents including esters, in particular partial esters of polybasic acids (e.g. phosphoric acid) with optionally oxyethylated fatty alcohols. Of the above mentioned the methyl esters, the sulphonation products and the phosphoric acid partial esters are particularly preferred. By the term "sulphonation" for the fatting agents, there is meant generally the introduction of a sulpho group, including also the formation of a sulphato group (="sulphating") and the introduction of a sulpho group by reaction with a sulphite of $SO_2$ (="sulphiting").

A conventional leather softener, in particular a cationic leather softener may, if desired, be applied in a final step, particularly if fatting has been carried out with a sulphonated fat-liquoring agent.

According to a particular aspect of the invention, the dyeing is after-treated with a polycationic fixing agent.

The polycationic after-treatment agents (fixing agents) may be any conventional hydrodispersible or preferably hydrosoluble, essentially colourless fixing agents employed in the dyeing of textiles or leather with hydrosoluble dyes. The polycationic after-treatment agents that come into consideration are mainly amino compounds and these may be quaternary and/or protonated ammonium compounds or also non-quaternised or non-protonated amines that form ammonium ions in aqueous in particular acidic medium.

These amino compounds that are to be used as fixing agents comprise mainly aliphatic polyamines (e.g. polymethylenediamines with 2–6 methylene groups in the polymethylene bridge or polyalkylenepolyamines in which alkylene contains 2–4 carbon atoms and containing 3–6 amino groups, or cyclic amines) which may bear one or more $C_{9-24}$-aliphatic hydrocarbon radicals and which optionally may be benzylated and/or alkylated with $C_{1-4}$-alkyl radicals, e.g. as described in U.S. Pat. Nos. 4,220,449; 4,297,296 and 4,335,259; British Pat. No. 2,165,268 and DE-A No. 25 08 242, 29 24 471 and 35 34 102; or basic nitrogen atom-containing reaction products of such polyamines or of monoamines that contain one or two $C_{1-4}$-alkyl radicals with cyanamide, dicyandiamide, guanidine, biguanide, epichlorohydrin, formaldehyde, dicarboxylic acids and/or methylolated nitrogen-compounds and optionally with alkylating agents or further reactants as described e.g. in U.S. Pat. Nos. 4,439,203; 4,511,707; 4,645,511 and 4,410,652, British Pat. No. 2,163,760 and DE-A No. 32 16 913, 34 46 284 and 35 25 104, in the PCT specification 81-2423 and in EP No. 151 370 A2; or amino group containing guanyl compounds as described in British Pat. No. 1 238 091; or also aromatic amino compounds. The polycationic compounds may optionally be blended with conventional additives, in particular with non-ionic, preferably hydrophilic dispersing agents (in particular for the production of aqueous dispersions of correspondingly dispersed amino compounds). As examples of such polycationic fixing agents there may be mentioned those identified in the above patent and patent applications or also methylolated melamine and condensation products of di-($C_{1-2}$-alkyl)-amine with epichlorohydrin (0.9:1 to 5:4). The disclosures of the aforementioned citations are incorporated herein by reference.

Preferably the polycationic after-treatment agents do not contain any fatty radicals with more than 9 carbon atoms, more preferably any hydrocarbon radicals with more than 7 carbon atoms, in particular any hydrocarbon radicals with more than 4 carbon atoms.

As opposed to the cationic softeners, the polycationic after-treatment agents (fixing agents) have a relatively high cationic charge density and are thus preferably essentially free of longer non-ionic radicals, in particular of longer fatty radicals (particularly as specified above) and of non-ionic hydrophilic chains; in particular they are preferably free of glycol radicals and of polyglycol ether radicals.

The after-treatment with the polycationic fixing agents is carried out advantageously in the same bath in which the dyeing has been carried out, preferably under acidic conditions, mainly at pH-values in the range of 3–5, preferably 3–4, in particular 3.3–4.

Preferably the after-treatment agent is added to the dye-bath when the liquor after the dyeing (if a fatting or fat-liquoring agent has been added also after the addition of this fatting agent) has been acidified to the above indicated pH-values, preferably at pH-values $\leq 4$, in particular at pH-values in the range of 3.3–4.

The after-treatment may, however, be also carried out in a separate fresh bath, advantageously after the pH of the dye bath has been lowered by acid addition and then has been drained off. The pH of the fresh liquor may range in any suitable scope, e.g. between pH 3 and pH 8, preferably pH 3 to 6.5, depending on the pH of the polycationic fixing agent; since, according to the preferred pH ranges described above, the leather is still soaked with acidic liquor further acidification of the bath will in general not be required.

The after-treatment is advantageously carried out in the same temperatur range as the dyeing, any fatting or fat-liquoring and any lowering of the pH-value by acid addition, preferably at 20–70° C., more preferably 25–60° C.

The concentration of the polycationic after-treatment agent is preferably in the range of 0.1–4%, more preferably 0.2–2%, referred to the wet weight of the leather substrate, or preferably 0.2–8%, more preferably 0.4–4%, referred to the dry weight of the substrate.

Any conclusive treatment with a leather-softener, in particular a cationic leather-softener is advantageously carried out only after the after-treatment with the polycationic fixing agent.

The treated substrate may then be further treated in conventional manner, e.g. rinsed or washed, drained, dried and cured.

By the process of the invention there may be achieved very fast brilliant and level dyeings and penetration dyeings of leather substrates, whereby the two dyestuff categories (a) and (b), in particular in the presence of the assistants (c) and optionally (d) surprisingly do not have a negative influence on each other. There are obtained optimum dye yields and notable fastnesses; of the fastnesses the light-fastness has to be particularly emphasized. The dyeings that are after-treated with the polycationic fixing agents have excellent fastness properties, in particular wet fastnesses.

In the following examples parts and percentages are by weight, the temperatures are indicated in degrees Celsius, the percentages in the application examples D and E refer to the weight of the leather-substrate, if there is not unequivocally meant the concentration of a solution or dispersion. The various products are employed in commercial form, the indicated quantities refer to the active substance, if not otherwise specified.

EXAMPLE 1

16 parts of the dye of formula

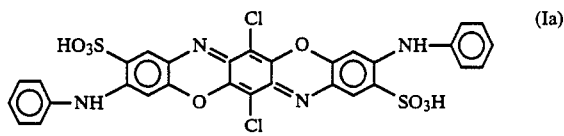

in the form of its sodium salt, 6 parts of the dye of formula

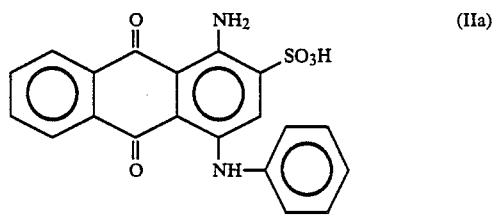

in the form of its sodium salt, 18 parts of sodium lignosulphonate and 53 parts of dried glucose syrup with an oligo- and polysaccharide content of 88–92% (Glucidex 21$^R$) are given into a mixer and thoroughly ground and mixed with each other. Together with the dyes of formula (Ia) and of the formula (IIa) 7 parts of salts (sodium chloride and sodium sulphate in even amounts) are present from the dye synthesis. 100 parts of a homogeneous blue powder are obtained.

Further dyestuff compositions that are produced analogously to example 1 and which are characterised by the quantitative ratios x, y, w and z are set out in the following table, x indicating the parts of dye of formula (Ia), y the parts of dye of formula (IIa), w the parts of lignine sulphonate and z the parts of dried glucose syrup. The quantity ratios of the above recipe appear in this table as example 1a.

| Example | x | y | w | z |
| --- | --- | --- | --- | --- |
| 1a | 16 | 6 | 18 | 53 |
| 1b | 16 | 6 | 18 | — |
| 1c | 16 | 5 | 20 | 30 |
| 1d | 16 | 3 | 27 | 54 |
| 1e | 16 | 3 | 27 | — |
| 1f | 16 | 7 | 18 | 64 |
| 1g | 16 | 9 | 9 | 66 |
| 1h | 16 | 9 | 9 | — |

EXAMPLES 2–7

Example 1 is repeated, the dye of formula (IIa) being replaced by the same quantity of the following dyes in the form of the sodium salts (M=sodium).

| Example | formula | $R_2$ | $R_3 = R_4 = R_5$ | R' | $R_6$ | $R_7$ | $R_9 = R_{10}$ |
|---|---|---|---|---|---|---|---|
| 2 | (II) | (α) | $CH_3$ | H | — | — | — |
| 3 | (II) | (α) | $CH_3$ | $CH_2-NH-CO-\underset{Cl}{C}=CH_2$ | — | — | — |
| 4 | (II) | (β) | — | — | (4) Benzoylamino | H | — |
| 5 | (II) | (β) | — | — | (3) Tosylamino | (6) $CH_3$ | — |
| 6 | (III) | — | $CH_3$ | — | — | — | (ε) |
| 7 | (II) | (β) | — | — | (4) (δ) | H | — |

APPLICATION EXAMPLE A1 (drum-dyeing)

100 parts of a chrome-tanned, synthetically retanned and intermediately dried sheep-suede for clothing are wetted back in the drum with 800 parts of water at 50°C., 2 parts of a 25% ammonia solution and 0.2 parts of the addition product of 10 moles of ethylene oxide to 1 mole of nonylphenol during 60 minutes, the liquor is then drained off and the leather is washed with water, which is again drained off. Then the leather is milled with 600 parts of water at 60° C., 1.5 parts of a 25% ammonia solution and 2 parts of a syntane (condensation product of phenol and sulphuric acid) for 15 minutes, 6 parts of the mixture of example 1a are then added and dyeing is continued for 60 minutes. 2 parts of an aqueous 60% emulsion of a sulphited fish-oil are added and the treatment is continued for further 30 minutes. The pH of the bath is then lowered by addition of formic acid of 8.5% concentration and the treatment is continued for further 30 minutes. (Final pH in the bath, 3.5–4). 1 part of an aqueous 30% dispersion of the acylation product of 1 mole N-(β-hydroxyethyl)-N-(β-aminoethyl)-amine with 1.5 moles of stearic acid is added and the treatment is continued for 20 minutes. The leather is then rinsed, drained and cured as usual. The treated leather is dyed tone-in-tone (grain-side against flesh-side) in a level pure blue shade with good fastnesses.

APPLICATION EXAMPLES A2 to A14

Application Example A1 is repeated with the difference that in place of the dye composition of Example 1a the same quantity of the dye compositions of Examples 1b (=A2), 1c (=A3), 1d (=A4), 1e (=A5), 1f (=A6), 1g (=A7), 1h (=A8), 2 (=A9), 3 (=A10), 4 (=A11), 5 (=A12), 6 (=A13), or 7 (=A14) respectively is employed.

APPLICATION EXAMPLE B1 (drum-dyeing)

100 parts of a chrome-tanned and neutralized wet-blue grain leather are treated with 300 parts of water of 40° C. and retanned by addition of 3 parts of a phenolic syntan during 60 minutes (final pH in the bath 5.6). The bath is then drained off and the leather rinsed. At this point the leather is dyed with 3 parts of the mixture of example 1a which are dissolved in 250 parts of water at 55° C., after 30 minutes of dyeing, 4 parts of a 60% emulsion of a sulphited fish-oil are added and fatting is continued for 45 minutes. The bath is then acidified with formic acid of 8.5% concentration and rotation is continued for 10 minutes (final pH in the bath 3.5–4.0). The leather is then rinsed, drained and cured as usual. The so-treated leather is dyed in a level pure blue shade of good fastnesses.

APPLICATION EXAMPLES B2 to B14

Application Example B1 is repeated with the difference that in place of the dye composition of Example 1a the same quantity of the dye compositions of Examples 1b (=B2), 1c (=B3), 1d (=B4), 1e (=B5), 1f (=B6), 1g (=B7), 1h (=B8), 2 (=B9), 3 (=B10), 4 (=B11), 5 (=B12), 6 (=B13) or 7 (=B14) respectively is employed.

APPLICATION EXAMPLE C1 (drum-dyeing)

100 parts of a chrome-synthetic tanned calf-leather which is retanned with a phenolic syntan and then intermediately dried are drummed with 1000 parts of water at 50° C. and 0.1 part of the addition product of 10 moles ethylene oxide to 1 mole nonylphenol. After 90 minutes the bath is drained off and a solution of 1 part of the mixture of example 1a in 1000 parts of water at 50° C. is added. After 60 minutes rotation the bath is acidified with a formic acid solution of 8.5% concentration and the treatment is continued for further 45 minutes (final pH in the bath 3.5–4.0). The bath is then drained off and the leather is rinsed, drained and cured as usual. There is obtained a leather that is dyed in a level pure blue shade with good fastnesses.

APPLICATION EXAMPLES C2 to C14

Application Example C1 is repeated with the difference that in place of the dye composition of Example 1a the same quantity of the dye compositions of Examples 1b (=C2), 1c (=C3), 1d (=C4), 1e (=C5), 1f (=C6), 1g (=C7), 1h (=C8), 2 (=C9), 3 (=C10), 4 (=C11), 5 (=C12), 6 (=C13), or 7 (=C14) respectively is employed.

APPLICATION EXAMPLE D1 (drum-dyeing)

The percentages refer to the dry weight of the substrate.

Leather for furniture.

Intermediately dried synthetically retanned chrome-leather (crust) of 1.2mm thickness are washed with 800% water, 2% of a 25% ammonia solution and 0.1% of the addition product of 10 moles ethyleneoxide to 1 mole of di-(t.butyl)-phenol for 90 minutes at 50° C. and then the bath is drained off. 400% of water at 40° C., 1.5% of a 25% ammonia solution, 2% of vegetable fatty acids that are partially esterified with methyl (fat-liquoring agent) and 1% of a sulpho group-containing oligophenolsulphone are added and after 15 minutes of drumming 6% of the dye-composition of example 1a are added and dyeing is continued for 90 minutes at 40° C. 3% of formic acid solution of 85% concentration (diluted 1:20) are then added and after 20 minutes the bath is drained off. 400% of water at 50° C. and 1% of the condensation product of dimethylamine and epichlorophydrin (1:1) in the form of its hydrochloride are then added and the treatment is continued for 30 minutes at this temperature; the bath is then drained off and the leather is washed with 600% of water of normal temperature (20° C.) for 10 minutes. The bath is drained off and the leather discharged. After draining the leather is dried and mechanically finished. There is obtained an excellent blue leather with outstanding fastnesses.

APPLICATION EXAMPLES D2 to D14

Application Example D1 is repeated with the difference that in place of the dye composition of Example 1a the same quantity of the dye compositions of Examples 1b (=D2), 1c (=D3), 1d (=D4), 1e (=D5), 1f (=D6), 1g (=D7), 1h (=D8), 2 (=D9), 3 (=D10), 4 (=D11), 5 (=D12), 6 (=D13) or 7 (=D14) respectively is employed.

APPLICATION EXAMPLE E1 (drum-dyeing)

The percentages refer to the wet weight of the employed substrate.

Chrome-tanned sheep-nappa which is neutralized to pH 5.8–6 and synthetically retanned is washed in the drum with 300% of water at 40° C. for 10 minutes and then the bath is drained off. 150% of water at 40° C., 1% of ammonia solution of 25% concentration and 2% of vegetable fatty acids, which are partially esterified with methyl (fat-liquoring agent) are added and after 10 minutes of drum-rotation, 3% of the dye composition of example 1a are added and dyeing is continued for 60 minutes at 40° C. Then there are added 100% of water at 55° C., 2% of vegetable fatty acids that are partially esterified by methyl (fat-liquoring agent), 6% of an 80% emulsion of sulphited fish-oil and 1.2% of the phosphoric acid partial ester of the addition product of 1 mole of tallow fatty alcohol and 4 moles of ethylene oxide in the form of its monoethanolammonium salt and treatment is continued for 60 minutes at 55° C.; then 1.5% of 85% formic acid are added in two additions at intervals of 10 minutes and the treatment is continued for 30 minutes. The bath is then drained off and the leather is washed with 300% of water at 50° C. for 10 minutes and the bath is again drained off. 200% of water at 50° C. and 1% of the condensation product of dimethylamine and epichlorohydrin (1/1) in the form of its hydrochloride are then added and treatment is continued for 30 minutes at this temperature. 0.5% of an aqueous 30% dispersion of the acylation product of 1 mole N-($\beta$-hydroxyethyl)-N-($\beta$-aminoethyl)-amine with 1.5 moles of stearic acid are then added and the treatment is continued for further 20 minutes at 50° C. after which the bath is drained off and the leather is washed with 300% of water at 25° C. for 10 minutes. Then the leather is discharged, drained and cured as usual. The obtained leather is dyed tone-in-tone (grain-side against flesh-side) in a level pure blue shade with excellent fastnesses.

APPLICATION EXAMPLES E2 to E14

Application Example E1 is repeated with the difference that in place of the dye composition of Example 1a the same quantity of the dye compositions of Examples 1b (=E2), 1c (=E3), 1d (=E4), 1e (=E5), 1f (=E6), 1g (=E7), 1h (=E8), 2 (=E9), 3 (=E10), 4 (=E11), 5 (=E12), 6 (=E13) or 7 (=E14) respectively is employed.

By replacing in the above examples D and E the condensation product of dimethylamine and epichlorohydrin in the form of its hydrochloride by the same quantity of the condensation product of dicyanodiamide, ammoniumchloride and formaldehyde (in the weight ratio 30:30:16) according to example A of GB-Pat. No. 1 238 091 or of the reaction product of dicyanodiamide and diethylenetriamine (in the molar ratio 1/1) in the form of its sulphate according to example 1 of DE-OS 35 25 104 there are also obtained very fine blue dyeings with very good fastnesses.

We claim:

1. A dye composition comprising (a) at least one blue sulpho group containing triphendioxazine dye of the formula

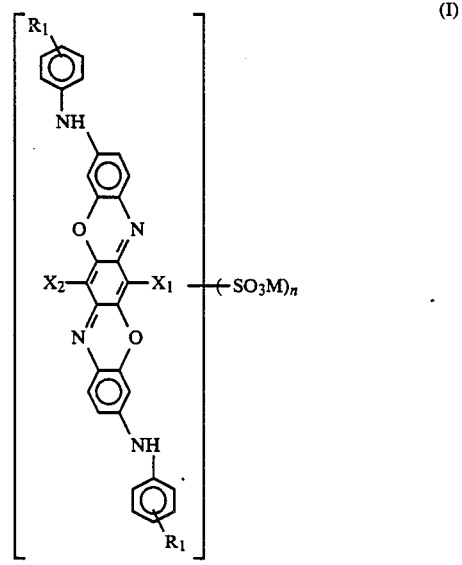

in which $R_1$ signifies hydrogen, chlorine or methyl,
$X_1$ and $X_2$ independently signify hydrogen, halogen, cyano, $C_{1-4}$-alkyl or $C_{1-4}$-alkoxy,
M signifies hydrogen or a cation and n is 2 to 3
and (b) at least one blue sulpho group containing anthraquinone dye of formula

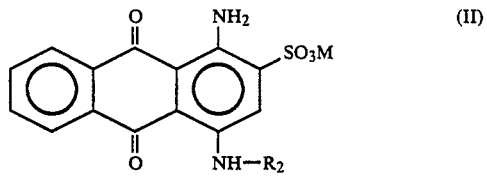

in which $R_2$ is a radical of formula

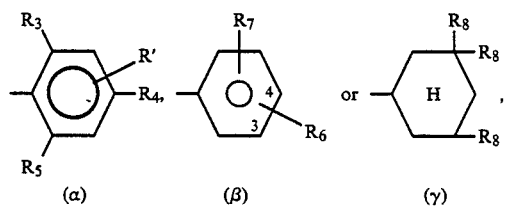

$R_3$, $R_4$ and $R_5$ independently signify hydrogen or methyl,
$R'$ signifies hydrogen or —$CH_2$—NH—CO—$R''$,
$R''$ signifies mono- or $\alpha,\beta$-dihalogen-vinyl or -ethyl,
$R_6$ signifies cyano or a radical of the formula

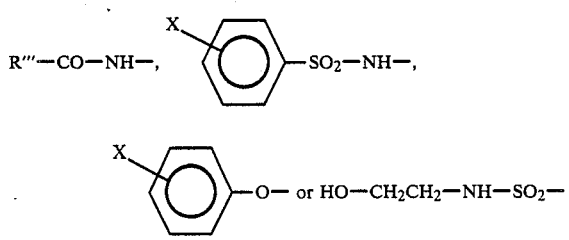

$R_7$ signifies hydrogen, chlorine or $C_{1-2}$-alkyl
or $R_7$ signifies hydrogen and $R_6$ signifies a radical of the formula

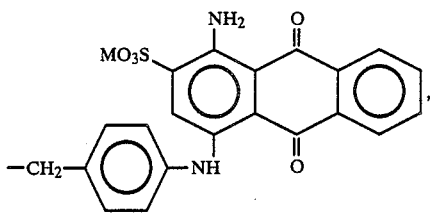 (δ)

in the 4-position of the radical (β),
$R_8$ signifies hydrogen or methyl,
X signifies hydrogen, methyl or chlorine,
R''' signifies $C_{1-2}$-alkyl or phenyl
and M signifies hydrogen or a cation,
or of the formula

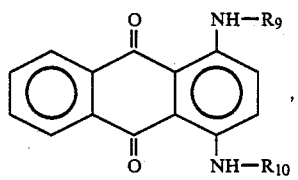 (III)

in which $R_9$ is a radical or the formula

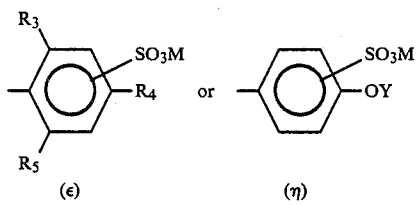

$R_{10}$ is a radical of the formula (γ) or (ε),
Y signifies hydrogen or $C_{1-2}$-alkyl
and M signifies hydrogen or a cation.

2. A composition according to claim 1 additionally comprising (c) lignosulphonic acid or a salt thereof.

3. A dye composition according to claim 1, containing per 100 parts by weight of dye (a) 18–60 parts by weight of dye (b).

4. A dye composition according to claim 2 containing per 100 parts by weight of the dye mixture (a)+(b) 20–200 parts by weight of component (c).

5. A dye composition according to claim 1, further containing a non-ionic blending agent (d).

6. A dye composition according to claim 2, further containing a non-ionic blending agent (d).

7. A dye composition according to claim 5, wherein (d) is a hydrophilic polysaccharide derivative.

8. A dye composition according to claim 1, in which the content of inorganic salts is at most 100% by weight of (a)+(b).

9. A dye composition according to claim 2 in which the content of inorganic salts is at most 100% by weight of (a)+(b).

10. A composition according to claim 1, wherein, in formula (I), $R_1$ is hydrogen, $X_1$ and $X_2$ are halogen, n is 2 and the sulfo groups are attached to condensed benzo rings, in formula (II), $R_2$ is a radical of formula (α) and, in formula (III), at least one of $R_9$ and $R_{10}$ is a radical of formula (ε).

11. A composition according to claim 1 wherein (b) is a dye of formula (III).

12. A composition according to claim 10 wherein (b) is a dye of formula (III).

13. A composition according to claim 10 wherein M is hydrogen or a cation selected from the group consisting of sodium, potassium, lithium, unsubstituted ammonium, mono-, di- and triethanolammonium and mono-, di- and tri-isopropanolammonium.

14. A composition according to claim 12 wherein, in formula (I), $X_1$ and $X_2$ are chlorine or bromine and one sulfo group is attached to each benzo ring in the position para to the corresponding oxygen atom and, in formula (III) each of $R_9$ and $R_{10}$ is a radical of formula (ε).

15. A composition according to claim 13 wherein, in formula (I), $X_1$ and $X_2$ are chlorine or bromine and one sulfo group is attached to each benzo ring in the position para to the corresponding oxygen atom and, in formula (III) each of $R_9$ and $R_{10}$ is a radical of formula (ε).

16. A composition according to claim 1 comprising
(a) at least one dye of formula (I) in which $X_1$ and $X_2$ are chlorine;
(b) at least one dye of formula (II) in which $R_2$ is a radical of formula (α) or (β) or of formula (III) in which at least one of $R_9$ and $R_{10}$ is of formula (ε);
(c) lignosulphonic acid or a salt thereof; and
(d) glucose syrup.

17. A composition according to claim 10 containing, per 100 parts by weight of dye (a), 18–60 parts by weight of dye (b).

18. A composition according to claim 13 containing, per 100 parts by weight of dye (a), 18–60 parts by weight of dye (b).

19. A composition according to claim 15 containing, per 100 parts by weight of dye (a), 18–60 parts by weight of dye (b).

20. A composition according to claim 16 wherein the weight ratio (b):(a) is 18:100 to 60:100, the weight ratio (c):(a+b) is 0.35:1 to 1.5:1 and the weight ratio (d):(a+b) is 1.2:1 to 5:1.

21. A composition according to claim 17 which further comprises (c) lignosulphonic acid or a salt thereof in an amount such that the weight ratio (c):(a+b) is 0.2:1 to 2:1.

22. A composition according to claim 18 which further comprises (c) lignosulphonic acid or a salt thereof in an amount such that the weight ratio (c):(a+b) is 0.2:1 to 2:1.

23. A composition according to claim 18 wherein (b) is a dye of formula (II) wherein $R_2$ is phenyl; 2,4,6-trimethylphenyl; 2,4,6-trimethyl-α-chloro-vinylcarbonamido-methylphenyl; 4-benzoylaminophenyl; 3-tosylamino-6-methyl-phenyl; or a radical of formula β in which $R_6$ is a radical of formula δ and $R_7$ is hydrogen.

24. A composition according to claim 19 which further comprises (c) lignosulphonic acid or a salt thereof in an amount such that the weight ratio (c):(a+b) is 0.35:1 to 1.5:1.

25. A composition according to claim 3 further comprising (c) lignosulphonic acid or a salt thereof in an amount such that the weight ratio (c):(a+b) is 0.2:1 to 2:1 and (d) a hydrophilic polysaccharide derivative in an amount such that the weight ratio (d):(a+b) is 1.2:1 to 5:1.

26. A composition according to claim 21 further comprising (d) a hydrophilic polysaccharide derivative in an amount such that the weight ratio (d):(a+b) is 1.2:1 to 5:1.

27. A composition according to claim 24 further comprising (d) a hydrophilic polysaccharide derivative in an amount such that the weight ratio (d):(a+b) is 1.2:1 to 5:1.

28. A process for dyeing leather which comprises dyeing the leather with a dye composition comprising
    (a) at least one blue sulpho group-containing triphendioxazine dye and
    (b) at least one blue sulpho group-containing anthraquinone dye.

29. A process according to claim 28 wherein the dye composition further comprises at least one of the members of the group consisting of
    (c) lignosulphonic acid or a salt thereof and
    (d) a nonionic blending agent.

30. A process according to claim 28 which further comprises aftertreating the dyed leather with a cationic fixing agent.

31. A process according to claim 29 which further comprises aftertreating the dyed leather with a cationic fixing agent.

32. A process for dyeing leather which comprises dyeing the leather with a composition according to claim 13.

33. A process for dyeing leather which comprises dyeing the leather with a composition according to claim 15.

34. A process for dyeing leather which comprises dyeing the leather with a composition according to claim 16.

35. A process for dyeing leather which comprises dyeing the leather with a composition according to claim 17.

36. A process for dyeing leather which comprises dyeing the leather from an aqueous medium containing a composition according to claim 20 and having a temperature in the range 20–70° C. and a pH in the range 3 to 9.

37. A process for dyeing leather which comprises dyeing the leather from an aqueous medium containing a composition according to claim 22 and having a temperature in the range 20–70° C. and a pH in the range 3 to 9.

38. A process for dyeing leather which comprises dyeing the leather from an aqueous medium containing a composition according to claim 23 and having a temperature in the range 20–70° C. and a pH in the range 3 to 9.

39. A process for dyeing leather which comprises dyeing the leather from an aqueous medium containing a composition according to claim 27 and having a temperature in the range 20–70° C. and a pH in the range 3 to 9.

40. Leather dyed by a process according to claim 28.
41. Leather dyed by a process according to claim 29.
42. Leather dyed by a process according to claim 30.
43. Leather dyed by a process according to claim 31.

* * * * *